(12) United States Patent
Hu et al.

(10) Patent No.: US 11,735,064 B2
(45) Date of Patent: Aug. 22, 2023

(54) SIMULATION DEVICE AND SIMULATION METHOD FOR GAS RESERVOIR EXPLOITATION

(71) Applicant: Southwest Petroleum University, Sichuan (CN)

(72) Inventors: Shuyong Hu, Sichuan (CN); Tao Long, Sichuan (CN); Boning Zhang, Sichuan (CN); Bingyang Zheng, Sichuan (CN)

(73) Assignee: Southwest Petroleum University, Sichuan (CN)

( * ) Notice: Subject to any disclaimer, the term of this patent is extended or adjusted under 35 U.S.C. 154(b) by 190 days.

(21) Appl. No.: 17/161,589

(22) Filed: Jan. 28, 2021

(65) Prior Publication Data

US 2021/0150933 A1 May 20, 2021

(30) Foreign Application Priority Data

Nov. 20, 2020 (CN) .......................... 202011308844.4

(51) Int. Cl.
*G09B 23/12* (2006.01)
*E21B 49/02* (2006.01)

(52) U.S. Cl.
CPC .............. *G09B 23/12* (2013.01); *E21B 49/02* (2013.01)

(58) Field of Classification Search
CPC ......... G09B 23/12; E21B 49/02; E21B 41/00; E21B 43/00; E21B 49/00; E21B 43/34; E21B 47/00
See application file for complete search history.

(56) References Cited

U.S. PATENT DOCUMENTS

| | | | | | |
|---|---|---|---|---|---|
| 4,544,206 | A | * | 10/1985 | Wier | E21B 43/28 299/5 |
| 2012/0173220 | A1 | * | 7/2012 | Li | G06F 30/23 703/10 |

FOREIGN PATENT DOCUMENTS

| | | | | | |
|---|---|---|---|---|---|
| CN | 101046146 | A | * | 10/2007 | ............ E21B 43/01 |
| CN | 202814960 | U | * | 3/2013 | ............ G01N 33/24 |
| CN | 104977195 | A | * | 10/2015 | ............ G01N 1/28 |
| CN | 105604545 | A | * | 5/2016 | |
| CN | 105606775 | A | * | 5/2016 | ............ G01N 33/00 |
| CN | 107542436 | A | * | 1/2018 | ............ E21B 43/16 |

* cited by examiner

*Primary Examiner* — Alexander Satanovsky
*Assistant Examiner* — Asm Fakhruddin

(57) ABSTRACT

A simulation device and a simulation method for gas reservoir exploitation are provided. The simulation device includes a gas-liquid supply system, a simulation system, a metering system, pipes for interconnecting each system, and switches, wherein: the gas-liquid supply system includes a gas supply system and a liquid supply system; the metering system is for metering gas and/or liquid produced after the simulation system; the simulation system includes core models having at least one of micro-fractures with an aperture smaller than 1 μm, map-fractures with an aperture between 10-20 μm, and large-fractures with an aperture between 100-5000 μm. The present invention is able to accurately simulate water invasion and water-controlled gas production processes of different fractured gas reservoirs under different bottom water energies.

7 Claims, 3 Drawing Sheets

SIMULATION DEVICE AND SIMULATION METHOD FOR GAS RESERVOIR EXPLOITATION

CROSS REFERENCE OF RELATED APPLICATION

The application claims priority under 35 U.S.C. 119(a-d) to CN 202011308844.4, filed Nov. 20, 2020.

BACKGROUND OF THE PRESENT INVENTION

Field of Invention

The present invention relates to technical fields of simulation device and simulation method for gas reservoir exploitation.

Description of Related Arts

With the continuous exploitation of natural gas and the decrease of formation pressure, the edge and bottom water of the gas reservoir will gradually invade the original gas-bearing area, causing the rapid decrease of gas output, the rapid increase of water output, and even the water logging phenomenon of the production well, which seriously affect the gas reservoir exploitation. For the gas reservoir which is already water-invaded, the gas output of the gas well is obviously decreased, and the gas well cannot drain water off with the own energy, making production more difficult. In order to avoid the occurrence of the above situation or control the development thereof, the water-controlled gas production technology is necessary. The physical simulation experiment of water-controlled gas production is the important means for researching and developing the water-controlled gas production technology, which provides the theoretical foundation and decision basis for the water-controlled gas production measure, so that the production personnel can determine the pressure difference and exploitation speed of reasonable production and establish the water control measure before or during exploitation; furthermore, because different types of reservoirs have different water invasion ways and mechanisms, the water control measure should be correspondingly adjusted. Thus, a specific design is also necessary for the physical simulation experiment of water-controlled gas production, so as to fully explore the water invasion regularities of the gas reservoir and provide the guidance for the exploitation of the water-invaded gas reservoir.

SUMMARY OF THE PRESENT INVENTION

One object of the present invention is to provide a simulation method which is able to accurately simulate a water invasion phenomenon appearing during gas reservoir exploitation, so as to find out water invasion regularities and make reasonable exploitation decisions.

The other object of the present invention is to provide a simulation device which is able to accurately simulate the water invasion phenomenon appearing during gas reservoir exploitation, so as to find out the water invasion regularities and make the reasonable exploitation decisions.

The present invention provides technical solutions as follows.

A simulation device for gas reservoir exploitation comprises a gas-liquid supply system, a simulation system, a metering system, pipes for interconnecting each system, and switches, wherein: the gas-liquid supply system comprises a gas supply system and a liquid supply system; the metering system is for metering gas and/or liquid produced after the simulation system; the simulation system comprises core models having at least one of micro-fractures with an aperture smaller than 1 m, map-fractures with an aperture between 10-20 m, and large-fractures with an aperture between 100-5000 m.

Preferably, a micro-fracture core model adopts a full-diameter core whose fractures are artificially generated.

Preferably, a map-fracture core model adopts a crushed full-diameter core.

Preferably, a large-fracture core model adopts a full-diameter core whose fractures are artificially generated.

Preferably, the gas supply system provides at least one water-insoluble gas for the simulation device, wherein: the water-insoluble gas comprises gas hardly soluble in water and gas absolutely insoluble in water, defined in the field, such as methane.

Preferably, the simulation device further comprises an intermediate system between the gas-liquid supply system and the simulation system, wherein: the intermediate system comprises a first intermediate container interconnected to the gas supply system and the simulation system, and a second intermediate container interconnected to the liquid supply system and the simulation system.

The intermediate system is able to effectively prevent gas source/water source pollution due to backflow of gas/liquid.

Preferably, the simulation device further comprises a separation system between the simulation system and the metering system, wherein: the separation system is for separating gas and liquid from a gas-liquid mixture after the simulation system; the metering system is for metering contents of gas and/or liquid after the separation system.

Further preferably, the metering system comprises a meter.

Further preferably, the separation system comprises a gas-liquid separator.

Preferably, the simulation device further comprises a control system for controlling overall operations of the simulation device.

Further preferably, the simulation device further comprises a storage system between the metering system and the control system, wherein: the storage system is for collecting liquid produced after the separation system.

Further preferably, the storage system comprises a water storage tank.

The present invention further provides a method for simulating a water invasion process with the above simulation device, comprising steps of:

through the switches in the simulation device, controlling gas in the gas supply system and/or liquid in the liquid supply system to enter different core models, so as to statistically analyze produced gas and/or liquid under different simulation conditions.

The present invention is able to accurately simulate the water invasion and water-controlled gas production processes of different fractured gas reservoirs under different bottom water energies.

DETAILED DESCRIPTION OF THE PREFERRED EMBODIMENT

The present invention is described in detail with the preferred embodiments and the accompanying drawings as follows. It should be understood that: the preferred embodiments and the accompanying drawings are only for explanatorily describing the present invention, not for limiting the protection scope of the present invention. The reasonable variants and combinations within the spirit of the present invention are all encompassed in the protection scope of the present invention.

A simulation device for gas reservoir exploitation, provided by the present invention, comprises a gas-liquid supply system, a simulation system and a control system, wherein the gas-liquid supply system comprises a gas supply system and a liquid supply system.

In one preferred embodiment, the simulation device further comprises an intermediate system between the gas-liquid supply system and the simulation system; the intermediate system comprises a first intermediate container interconnected to the gas supply system and the simulation system, and a second intermediate container interconnected to the liquid supply system and the simulation system.

The intermediate system prevents gas source/water source pollution due to backflow of gas/liquid.

In one preferred embodiment, the simulation device further comprises a separation system between the simulation system and the control system; the separation system comprises a gas-liquid separator.

In one preferred embodiment, the simulation device further comprises a metering system between the separation system and the control system; the metering system comprises a meter.

In one preferred embodiment, the simulation device further comprises a storage system between the metering system and the control system; the storage system comprises a water storage tank.

First Preferred Embodiment

Figure 1:
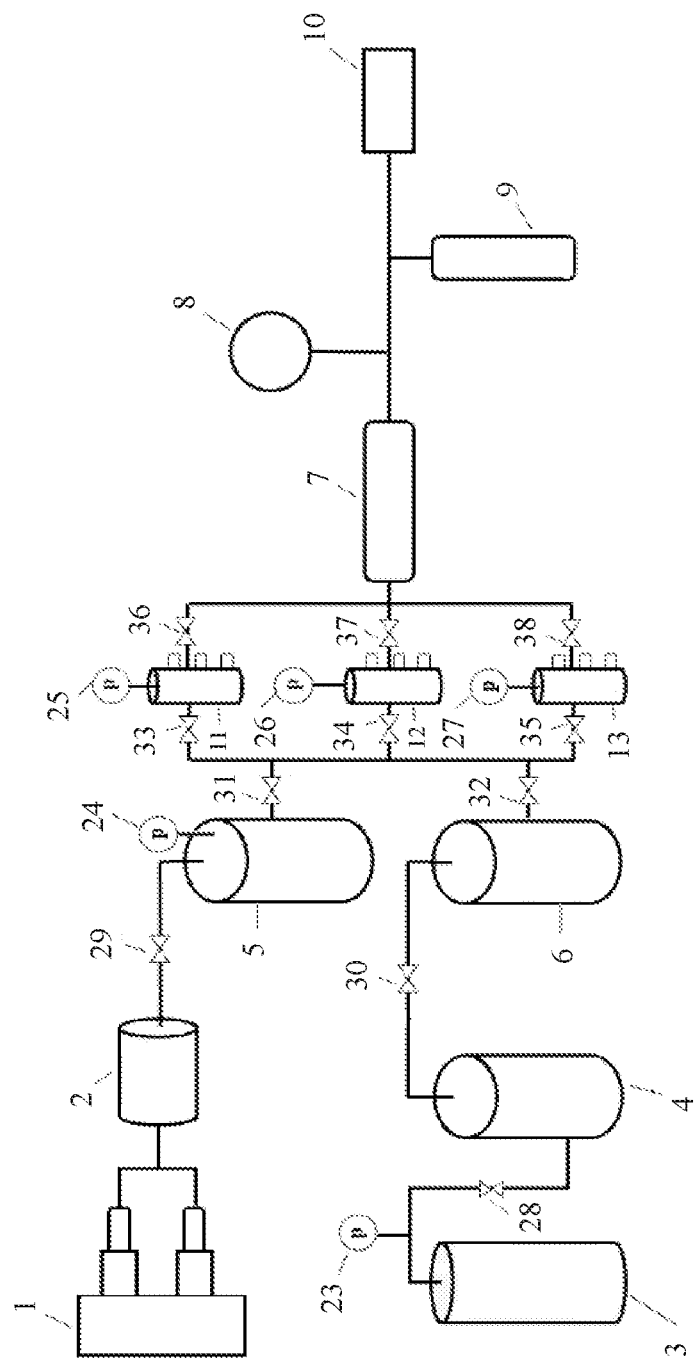
FIG. 1 is an overall structural sketch view of a simulation device for gas reservoir exploitation according to a first preferred embodiment of the present invention.
Figure 2:
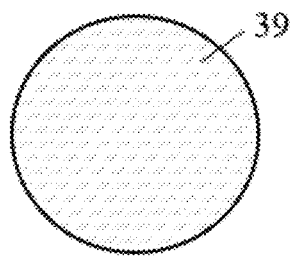
FIG. 2 is a sectional view of an artificial micro-fracture core in a first core holder of the simulation device according to the first preferred embodiment of the present invention.
Figure 3:
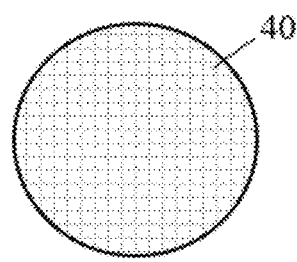
FIG. 3 is a sectional view of an artificial map-fracture core in a second core holder of the simulation device according to the first preferred embodiment of the present invention.
Figure 4:
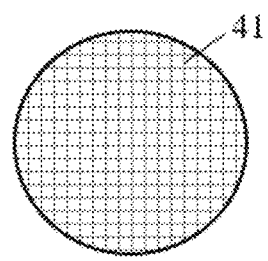
FIG. 4 is a sectional view of an artificial large-fracture core in a third core holder of the simulation device according to the first preferred embodiment of the present invention.
Figure 5:
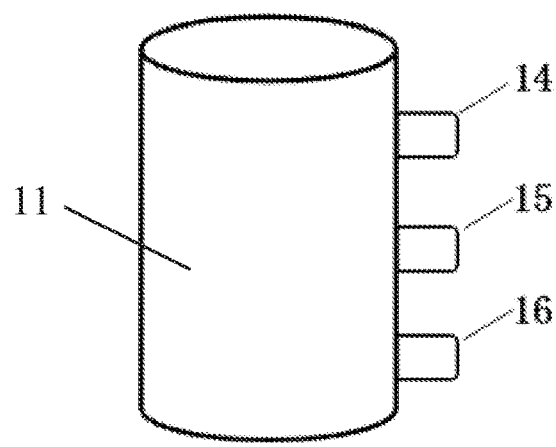
FIG. 5 is a sketch view of first detecting and recording components of a first simulation unit of the simulation device according to the first preferred embodiment of the present invention.
Figure 6:
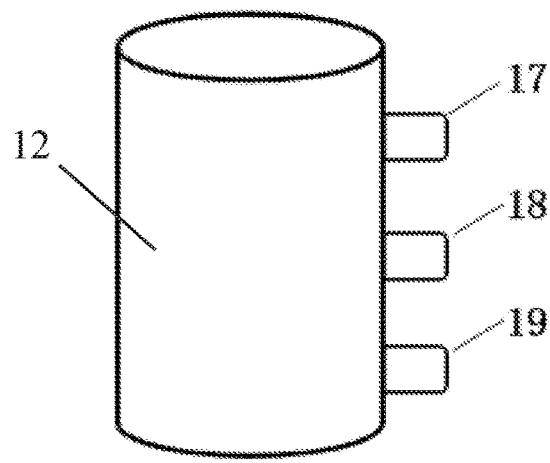
FIG. 6 is a sketch view of second detecting and recording components of a second simulation unit of the simulation device according to the first preferred embodiment of the present invention.
Figure 7:
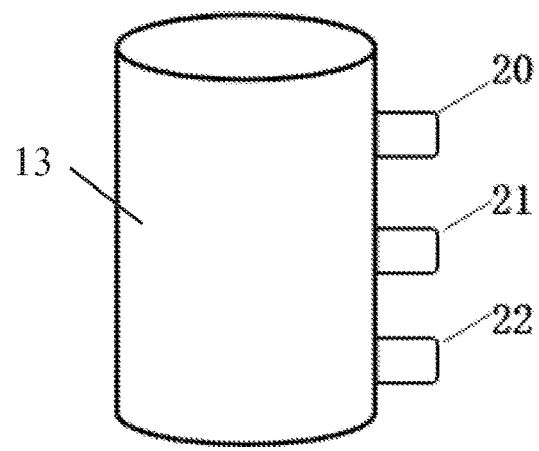
FIG. 7 is a sketch view of third detecting and recording components of a third simulation unit of the simulation device according to the first preferred embodiment of the present invention.

As shown in FIG. 1, a simulation device for gas reservoir exploitation comprises:
pipes for interconnecting each system;
a gas-liquid supply system, comprising a gas supply system and a liquid supply system, wherein: the gas supply system comprises a gas source container 2 which contains water-insoluble gas such as methane and a twin-cylinder pump 1 for dynamical transport of the gas; the liquid supply system comprises a water source container 4 which contains formation water or distilled water, a gas cylinder 3 containing methane, a first valve switch 28 interconnected to the water source container 4 and the gas cylinder 3, and a first barometer 23 between the first valve switch 28 and the gas cylinder 3;

an intermediate system, comprising a first intermediate container 5, a second valve switch 29 interconnected to the gas source container 2 and the first intermediate container 5, a second barometer 24 for measuring an air pressure of the first intermediate container 5, a fourth valve switch 31 interconnected to the first intermediate container 5 and a simulation system, a second intermediate container 6, a third valve switch 30 interconnected to the water source container 4 and the second intermediate container 6, and a fifth valve switch 32 interconnected to the second intermediate container 6 and the simulation system;

the simulation system, comprising three parallel simulation units which are interconnected to the gas-liquid supply system through the intermediate system, wherein: each simulation unit comprises a core holder, a set of detecting and recording components connected to an inner wall of the core holder, a barometer for measuring an air pressure inside the core holder, and two valve switches respectively between the core holder and the intermediate system and between the core holder and a separation system; particularly, the simulation system comprises a first simulation unit, a second simulation unit and a third simulation unit which are parallel; the first simulation unit comprises a first core holder 11, first detecting and recording components for detecting and recording the first core holder 11, a sixth valve switch 33 between the intermediate system and the first core holder 11, a third barometer 25 for measuring an air pressure of the first core holder 11, and a ninth switch valve 36 between the first core holder 11 and the separation system; the second simulation unit comprises a second core holder 12, second detecting and recording components for detecting and recording the second core holder 12, a seventh valve switch 34 between the intermediate system and the second core holder 12, a fourth barometer 26 for measuring an air pressure of the second core holder 12, and a tenth valve switch 37 between the second core holder 12 and the separation system; the third simulation unit comprises a third core holder 13, third detecting and recording components for detecting and recording the third core holder 13, an eighth valve switch 35 between the intermediate system and the third core holder 13, a fifth barometer 27 for measuring an air pressure of the third core holder 13, and an eleventh valve switch 38 between the third core holder 13 and the separation system; the sixth valve switch 33, the seventh valve switch 34 and the eighth valve switch 35 are all interconnected to the fourth valve switch 31 and the fifth valve switch 32 of the intermediate system; as shown in FIG. 5, the first detecting and recording components comprise a first detecting and recording device 14, a second detecting and recording device 15 and a third detecting and recording device 16, respectively for detecting and recording data of an upper part, a middle part, and a lower part of the first core holder 11; as shown in FIG. 6, the second detecting and recording components comprise a fourth detecting and recording device 17, a fifth detecting and recording device 18 and a sixth detecting and recording device 19, respectively for detecting and recording data of an upper part, a middle part, and a lower part of the second core holder 12; as shown in FIG. 7, the third detecting and recording components comprise a seventh detecting and recording device 20, an eighth detecting and recording device 21 and a ninth detecting and recording device 22, respectively for detecting and recording data of an upper part, a middle part, and a lower part of the third core holder 13; each detecting and recording device is electrically connected to the barometer of the corresponding core holder; the detecting and recording devices detect and record currents at different positions of the water body after water enters the corresponding core holder; after obtaining the currents generated by the electron transfer of redox reaction, the water saturation inside each core holed can be further determined; detecting and recording of water saturation and residual pressure inside each core holder can be realized; particularly, after water enters the core holder, the detecting and recording device transforms the electrical resistivity into the water saturation through the electric signal, and meanwhile the residual pressure inside the core holder is obtained through the barometer;

the separation system, comprising a gas-liquid separator 7, wherein: the gas-liquid separator 7 is interconnected to the ninth valve switch 36, the tenth valve switch 37 and the eleventh valve switch 38; the gas-liquid separator 7 can adopt a conventional device which is able to separate a gas-liquid mixture;

a metering system, comprising a meter 8, wherein the meter 8 can adopt a precession vortex flowmeter;

a storage system, comprising a water storage tank 9; and a control system, comprising a computer 10, for recording and analyzing data of each test instrument;

wherein: a micro-fracture model for simulating micro-fractures, with an aperture smaller than 1 μm, is arranged in the first core holder 11, as shown in FIG. 2; a map-fracture model for simulating map-fractures, with an aperture between 10-20 μm, is arranged in the second core holder 12, as shown in FIG. 3; a large-fracture model for simulating large-fractures is arranged in the third core holder 13, with an aperture larger than 100 μm, preferably 100-5000 μm, as shown in FIG. 4.

Second Preferred Embodiment

According to the simulation device in the first preferred embodiment, the micro-fracture model in the first core holder 11 adopts a full-diameter core 39 whose fractures are artificially generated, and the full-diameter core 39 has a diameter of 3 cm and a length of 5 cm; the map-fracture model in the second core holder 12 adopts a crushed full-diameter core 40 with a diameter of 3 cm and a length of 5 cm; the large-fracture model in the third core holder 13 adopts a full-diameter core 41 whose fractures are artificially generated, and the full-diameter core 41 has a diameter of 3 cm and a length of 5 cm.

Third Preferred Embodiment: Simulation with Simulation Device in Second Preferred Embodiment (1) Simulation of Water Invasion Modes Under Different Formation Dips The placement angles of the different core holders 11-13 are adjusted in the clockwise direction, and each valve switch is opened or closed according to requirements, so that the metering data after the different core holders are obtained through the metering system, wherein:

the adjustment angle of each core holder is generally 0-90°; with the adjustment angle of 0°, bottom water coning under the condition that the core holder is vertically arranged is simulated; with the adjustment angle of 90°, edge water incursion under the condition that the core holder is horizontally arranged is simulated; for example, when simulating the water invasion process with the micro-fractures under the formation dip of 15°, the first core holder 11 is adjusted by 15° clockwise, and then the fourth valve switch 31, the fifth valve switch 32 and the sixth valve switch 33 are opened, so that the gas supply system and the liquid supply system are interconnected to the first core holder 11; thereafter, data of the metering system are collected for analysis.

(2) Simulation of Distribution Modes of Different Fractures

The detailed simulation processes are described in the fourth to sixth preferred embodiments.

(3) Simulation of Different Bottom Water Energies

The pressure exerted by the gas cylinder on water source is adjusted through the first valve switch 28, so as to simulate different edge and bottom water energies, wherein: during simulation, the core holder of corresponding fracture type is arranged vertically.

During the above simulation processes, different opening or closing times of the valves are set, so as to simulate different production pressure differences; through the detecting and recording devices, the whole water invasion process is monitored, and the water saturation is obtained; for example, when liquid in the liquid supply system enters the specified core holder through the third valve switch 30, the second intermediate container 6 and the fifth valve switch 32, the detecting and recording devices on the specified core holder are opened; through metering by the metering system, the instantaneous gas output, the instantaneous water output, the cumulative gas output and the cumulative water output during water-controlled gas production under different simulation conditions are obtained.

Fourth Preferred Embodiment

Under a condition that all of the valve switches are closed, a simulation method for bottom water coning of micro-fracture gas reservoir, with the simulation device in the second preferred embodiment, comprises steps of:

(1) pressurizing the gas source container 2 through the twin-cylinder pump 1 with a set pressure or flow velocity; opening the second valve switch 29, so that gas in the gas source container 2 enters the first intermediate container 5; after the second barometer 24 shows that the air pressure inside the first intermediate container 5 reaches a specified pressure, closing the second valve switch 29, and opening the fourth valve switch 31 and the sixth valve switch 33, so that gas enters the first core holder 11;

(2) after the third barometer 25 shows that the air pressure inside the first core holder 11 reaches a preset pressure, closing the fourth valve switch 31 and the sixth valve switch 33; waiting until the micro-fracture model is saturated with gas; after the micro-fracture model is saturated with gas, opening the gas cylinder 3 and the first valve switch 28; continuously pressurizing the water source container 4 through the gas cylinder 3 under several set pressure gradients; successively opening the third valve switch 30, the fifth valve switch 32 and the sixth valve switch 33, so that water in the water source container 4 enters the first core holder 11 through the second intermediate container 6, thereby simulating a gas reservoir exploitation process meeting with bottom water coning; and (3) for the ninth valve switch 36, setting outlet pressures of different gradients from large to small, so as to simulate different production pressure differences; recording changes of water saturation through the detecting and recording devices 14-16 connected to the inner wall of the first core holder 11; separating gas and liquid produced during the experimental process through the gas-liquid separator 7; metering separated gas and liquid through the meter 8, and obtaining data such as an instantaneous water output, an instantaneous gas output and a cumulative gas output; after separated water enters the water storage tank 9 and is stored therein, obtaining a cumulative water output, and further calculating an instantaneous water-gas ratio (instantaneous gas output/instantaneous water output), so that a trend curve diagram of a relationship between the cumulative gas output and the cumulative water output is obtained;

wherein: pressure parameters, such as the specified pressure, the preset pressure and the pressure gradients, are set according to the gas field required to be simulated; for example, the original formation pressure of one gas field in 2005 is 35 MPa; after exploiting for four years, the formation pressure is decreased to 25 MPa, and water is produced; through calculation, the abandoned formation pressure is 8 MPa; therefore, the pressure parameters are set in a range of 8-25 MPa; the pressure gradients can be set as 8 MPa, 16 MPa and 25 MPa; or, the pressure gradients can be set as 8 MPa, 12 MPa, 15 MPa, 18 MPa, 22 MPa and 25 MPa.

Fifth Preferred Embodiment

Under a condition that all of the valve switches are closed, a simulation method for bottom water coning of map-fracture gas reservoir, with the simulation device in the second preferred embodiment, comprises steps of:

(1) pressurizing the gas source container 2 through the twin-cylinder pump 1 with a set pressure or flow velocity; opening the second valve switch 29, so that gas in the gas source container 2 enters the first intermediate container 5; after the second barometer 24 shows that the air pressure inside the first intermediate container 5 reaches a specified pressure, closing the second valve switch 29, and opening the fourth valve switch 31 and the seventh valve switch 34, so that gas enters the second core holder 12;

(2) after the fourth barometer 26 shows that the air pressure inside the second core holder 12 reaches a preset pressure, closing the fourth valve switch 31 and the seventh valve switch 34; waiting until the map-fracture model is saturated with gas; after the map-fracture model is saturated with gas, opening the gas cylinder 3 and the first valve switch 28; continuously pressurizing the water source container 4 through the gas cylinder 3 under several set pressure gradients; successively opening the third valve switch 30, the fifth valve switch 32 and the seventh valve switch 34, so that water in the water source container 4 enters the second core holder 12 through the second intermediate container 6, thereby simulating a gas reservoir exploitation process meeting with bottom water coning; and (3) for the tenth valve switch 37, setting outlet pressures of different gradients from large to small, so as to simulate different production pressure differences; recording changes of water saturation through the detecting and recording devices 17-19 connected to the inner wall of the second core holder 12; separating gas and liquid produced during the experimental process through the gas-liquid separator 7; metering separated gas and liquid through the meter 8, and obtaining data such as an instantaneous water output, an instantaneous gas output and a cumulative gas output; after separated water enters the water storage tank 9 and is stored therein, obtaining a cumulative water output.

Sixth Preferred Embodiment

Under a condition that all of the valve switches are closed, a simulation method for bottom water coning of large-fracture gas reservoir, with the simulation device in the second preferred embodiment, comprises steps of:

(1) pressurizing the gas source container 2 through the twin-cylinder pump 1 with a set pressure or flow velocity; opening the second valve switch 29, so that gas in the gas source container 2 enters the first intermediate container 5; after the second barometer 24 shows that the air pressure inside the first intermediate container 5 reaches a specified pressure, closing the second valve switch 29, and opening the fourth valve switch 31 and the eighth valve switch 35, so that gas enters the third core holder 13;

(2) after the fifth barometer 27 shows that the air pressure inside the third core holder 13 reaches a preset pressure, closing the fourth valve switch 31 and the eighth valve switch 35; waiting until the large-fracture model is saturated with gas; after the large-fracture model is saturated with gas, opening the gas cylinder 3 and the first valve switch 28; continuously pressurizing the water source container 4 through the gas cylinder 3 under several set pressure gradients; successively opening the third valve switch 30, the fifth valve switch 32 and the eighth valve switch 35, so that water in the water source container 4 enters the third core holder 13 through the second intermediate container 6, thereby simulating a gas reservoir exploitation process meeting with bottom water coning; and (3) for the eleventh valve switch 38, setting outlet pressures of different gradients from large to small, so as to simulate different production pressure differences; recording changes of water saturation through the detecting and recording devices 20-22 connected to the inner wall of the third core holder 13; separating gas and liquid produced during the experimental process through the gas-liquid separator 7; metering separated gas and liquid through the meter 8, and obtaining data such as an instantaneous water output, an instantaneous gas output and a cumulative gas output; after separated water enters the water storage tank 9 and is stored therein, obtaining a cumulative water output.

The above embodiments are only the preferred embodiments of the present invention, and the protection scope of the present invention is not limited thereto. The technical solutions within the spirit of the present invention are all encompassed in the protection scope of the present invention. It should be noted that: for one of ordinary skill in the art, improvements and modifications made without departing from the principle of the present invention are also encompassed in the protection scope of the present invention.

What is claimed is:

1. A simulation device for gas reservoir exploitation, comprising a gas-liquid supply system, a simulation system and a control system, wherein:
the gas-liquid supply system comprises a gas supply system and a liquid supply system, wherein:
the gas supply system comprises a gas source container and a twin-cylinder pump for dynamical transport of the water-insoluble gas;

the liquid supply system comprises a water source container, a gas cylinder, a first valve switch interconnected to the water source container and the gas cylinder, and a first barometer between the first valve switch and the gas cylinder;

the simulation system comprises a first simulation unit, a second simulation unit and a third simulation unit all of which are connected with each other in parallel, wherein:

the first simulation unit comprises a first core holder, first detecting and recording components connected with the first core holder for detecting and recording the first core holder, a third barometer for measuring an air pressure of the first core holder, a sixth valve switch, and a ninth valve switch;

the second simulation unit comprises a second core holder, second detecting and recording components connected with the second core holder for detecting and recording the second core holder, a fourth barometer for measuring an air pressure of the second core holder, a seventh valve switch and a tenth valve switch;

the third simulation unit comprises a third core holder, third detecting and recording components connected with the third core holder for detecting and recording the third core holder, a fifth barometer for measuring an air pressure of the third core holder, an eighth valve switch and an eleventh valve switch;

the control system is configured to record and analyze data of the gas-liquid supply system and the simulation system;

through the sixth, seventh and eighth valve switches of the simulation system, gas in the gas supply system and liquid in the liquid supply system are controlled to enter different core holders, so as to statistically analyze produced gas and liquid under different simulation conditions.

2. The simulation device for gas reservoir exploitation according to claim 1, further comprising an intermediate system between the gas-liquid supply system and the simulation system, wherein:

the intermediate system comprises a first intermediate container, a second valve switch interconnected to the gas source container and the first intermediate container, a second barometer for measuring an air pressure of the first intermediate container, a fourth valve switch interconnected to the first intermediate container and the simulation system, a second intermediate container, a third valve switch interconnected to the water source container and the second intermediate container, and a fifth valve switch interconnected to the second intermediate container and the simulation system;

the sixth valve switch is provided between the intermediate system and the first core holder;

the seventh valve switch is provided between the intermediate system and the second core holder;

the eighth valve switch is provided between the intermediate system and the third core holder;

the sixth valve switch, the seventh valve switch and the eighth valve switch are all interconnected to the fourth valve switch and the fifth valve switch of the intermediate system.

3. The simulation device for gas reservoir exploitation according to claim 2, wherein:

the first detecting and recording components comprise a first detecting and recording device, a second detecting and recording device and a third detecting and recording device, respectively for detecting and recording data of an upper part, a middle part, and a lower part of the first core holder;

the second detecting and recording components comprise a fourth detecting and recording device, a fifth detecting and recording device and a sixth detecting and recording device, respectively for detecting and recording data of an upper part, a middle part, and a lower part of the second core holder;

the third detecting and recording components comprise a seventh detecting and recording device, an eighth detecting and recording device and a ninth detecting and recording device, respectively for detecting and recording data of an upper part, a middle part, and a lower part of the third core holder;

the first, second and third detecting and recording devices are electrically connected to the third barometer;

the fourth, fifth and sixth detecting and recording devices are electrically connected to the fourth barometer;

the seventh, eighth and ninth detecting and recording devices are electrically connected to the fifth barometer.

4. The simulation device for gas reservoir exploitation according to claim 2, further comprising a separation system which comprises a gas-liquid separator, wherein the gas-liquid separator is interconnected to the ninth, tenth and eleventh valve switches.

5. The simulation device for gas reservoir exploitation according to claim 4, further comprising a metering system which comprises a meter connected with the separation system.

6. The simulation device for gas reservoir exploitation according to claim 5, further comprising a storage system which comprises a water storage tank connected with the metering system.

7. The simulation device for gas reservoir exploitation according to claim 2, wherein:

a micro-fracture model for simulating micro-fractures, with an aperture smaller than 1 μm, is arranged in the first core holder;

a map-fracture model for simulating map-fractures, with an aperture in a range of 10-20 μm, is arranged in the second core holder;

a large-fracture model for simulating large-fractures is arranged in the third core holder, with an aperture in a range of 100-5000 μm.

\* \* \* \* \*